Jan. 23, 1968 A. C. McINTOSH ET AL 3,365,589
PULSE MEASURING SYSTEM
Filed May 18, 1965
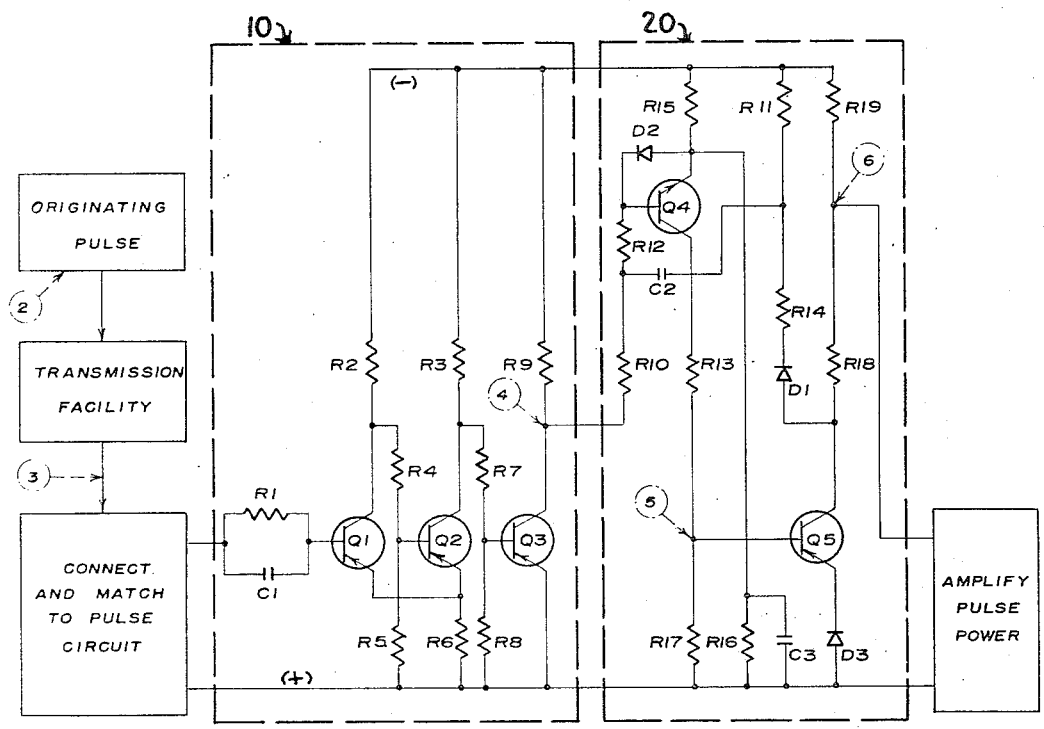
FIG. 1
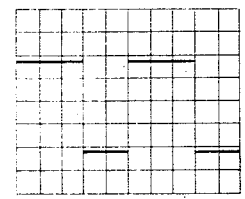
ORIGINAL PULSE WIDTH CHARACTERISTIC
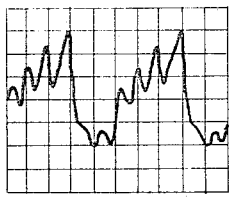
RECEIVED PULSES
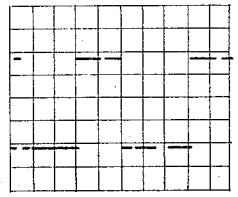
DETECTED PULSES
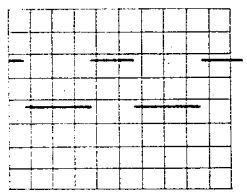
DELAYED PULSES
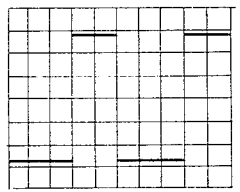
RESTORED PULSE
ALEX C. McINTOSH
DARYL FREDERICK PROCTOR
INVENTORS
ATTORNEYS.

United States Patent Office 3,365,589
Patented Jan. 23, 1968

3,365,589
PULSE MEASURING SYSTEM
Alex C. McIntosh, Everett, and Daryl Frederick
Proctor, Bellevue, Wash., assignors to Proctor
and Associates Company, Redmond, Wash., a
corporation of Washington
Filed May 18, 1965, Ser. No. 456,667
8 Claims. (Cl. 307—293)

ABSTRACT OF THE DISCLOSURE

A pulse measuring system is provided to accurately measure and reproduce, i.e. to measure the width of, D.C. pulses that have been distorted by transmission over intermediate facilities. The distorted pulse is squared to simulate the original pulse and then phase-shifted a predetermined time constant to eliminate the effects of transients added by the intermediate transmission facility.

---

The present invention relates to the measurement or monitoring of pulses after they have been transmitted over an intermediate facility which has caused distortion of the pulse shape.

Transmission facilities contribute varying degrees of electrical noise and transient pulses making accurate pulse measurements impossible using the average current method or other past testing principles. The present invention aims to provide an improved pulse measuring procedure and apparatus which makes possible accurate pulse measurements even after pulse transmission over extremely poor facilities. More particularly, the invention aims to provide a practical and accurate system for extracting the width of the original pulse from the combined electrical noise and distorted pulse power appearing at any point in a circuit.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 1 is a schematic of a pulse analyzer system embodying the present invention; and FIGS. 2–6 are typical oscilloscope wave forms for a 40% make pulse taken at various points in the system indicated by circled respective numerals in FIG. 1.

The circuit procedure used in accordance with the present invention to extract the width of a given pulse after distortion include, (1) accurately detecting pulse initiation and termination, (2) reconstructing the pulse as a square wave simulating the original pulse, and (3) shifting the phase of the square wave a predetermined time constant to eliminate transient pulses of lesser period.

Referring to FIG. 1, it is seen that the transmitted pulse to be measured is fed as the input to an analyzer network which has its own D.C. power supply and is matched to the pulse circuit. The analyzer includes a squaring circuit 10 with amplification comprising a Schmitt trigger made up of PNP transistors Q1–Q2, and resistors R2 through R6. As part of the present invention this squaring circuit is provided with a capacitance-resistance coupling R1–C1 to serve as a sensor and accurately trigger transistor Q1 at the start and finish of each pulse.

The detection of the start of a transmitted pulse is complicated by the fact that when the input pulse is received from the transmission facility it is commonly highly distorted as shown, for example, in FIGURE 3. As a consequence, the leading edge of the pulse is sloped further from an ordinate step than the trailing edge. Hence, if used in that form as an input to trigger the squaring circuit, the width of the resulting squared output would not accurately portray the original pulse width.

By using the sensor coupling R1–C1 for the squaring circuit, the A.C. component of the input pulse at the initial change of state passes as an "on" signal through the capacitor C1 (low impedance) to transistor Q1 (normally off) while the D.C. component of the input pulse passes as a "holding" signal through the resistor R1 (high impedance). In this manner the A.C. component turns on transistor Q1 and responsively cuts off transistor Q2 (normally on) at the very start of the input pulse regardless of the amount of pulse distortion. Then, before transistor Q1 can cut off, the D.C. component input takes effect to maintain saturation until the end of the pulse. The trailing edge of the pulse, even when the pulse is badly distorted, is a sharp break giving an accurate cut-off signal whereby transistor Q2 again operates at saturation, cutting off transistor Q1, and returning the squaring circuit to its original no input condition.

The output from the squaring circuit is amplified and inverted by a single-transistor amplifier-inverter circuit comprising a PNP transistor Q3 coupled by a resistor R7 and biased by resistors R8 and R9. As shown in FIG. 4, the amplified output of the resistance-capacitance coupled squaring circuit 10 is predominantly a square wave. However, it will be noted that the pulse width lines are interrupted by gaps. These gaps are caused by spikes (not shown) representing transient pulses of higher frequencies than the "true" pulse to be measured. Such transient pulses are also responsible for the numerous distortion valleys in the input pulse wave shown in FIGURE 3.

The next step accomplished by the analyzer is to shift the detected pulse phases an amount greater than the period of any transient pulses to eliminate or reject the sensed transient pulses. This step is performed by a circuit 20 having a predetermined time delay network made up of capacitor C2 and resistances R10–R11 feeding from the output of transistor Q3 and by-passing a normally-off NPN transistor Q4. The effect of this network is to delay the triggering of transistor Q4 long enough to insure that all transient pulses will have by-passed this transistor. As a consequence, the only pulses capable of triggering transistor Q4 are those with a period longer than the time delay constant, and namely, the "true" pulses to be measured.

The delayed pulses feed through a coupling resistor R12 to the base of transistor Q4 which is in turn coupled by a resistor R13 to a PNP transistor Q5 (normally off). It will be noted that the collector of this latter transistor is connected by a diode D1 to a time delay restoring network consisting of a resistor R14 (matching resistor R11), and resistor R10 and capacitor C2 from the input delay network. The circuit for transistor Q4 also includes a clamping diode D2 between the base and emitter, and emitter-connected resistors R15–R16 and capacitor C3. The emitter of transistor Q5 is protected by a diode D3, and its circuit is completed by base resistor R17 and output coupled resistors R18–R19.

When a delayed pulse triggers transistor Q4, the output therefrom in turn immediately turns on transistor Q5. This discharges capacitor C2 via resistances R14 and R10 to restore the time delay network R10, C1, R11 to its normal state in preparation to duplicate the delay constant at the end or turn-off portion of the pulse. The turn-on of transistor Q5 also provides the restored turn-on signal to the pulse amplifier.

The turn-off portion of each pulse signal appears through the analyzer circuitry exactly the same as the "on" signal except that it returns transistors Q1, Q2 and Q3 to normal. Q4 is delayed in returning to normal by a duplicate time constant delay through network R10, C2, R14. When Q4 returns to normal it immediately restores transistor Q5 which provides the "off" portion of the pulse to the pulse amplifier. Q5 also again restores capacitor C2 to its normal discharged state and prepares the delay network R10, C2, R11 for the next "on" pulse.

Thus, the net effect of the time constant delay network is to give a pulse output from transistor Q4 which has a shifted phase as shown in FIGURE 5. Upon amplification and readout on a scale which has been shifted in correspondence with the phase shift of the pulse, the width characteristics of the original pulse is restored as shown in FIGURE 6. The restored pulse may then be handled for a variety of types of readout and comparisons.

It is believed that the invention will have been clearly understood from the foregoing detailed description of our now-preferred illustrated embodiment. Changes in the details of construction may be resorted to without departing from the spirit of the invention and it is accordingly our intention that no limitations be implied and that the hereto annexed claims be given the broadest interpretation to which the employed language fairly admits.

What we claim is:

1. In combination, a Schmitt trigger, and a parallel coupled resistor and capacitor at the input of the trigger to turn on and turn off the trigger at the initiation and termination of a pulse input to be squared, a normally off first transistor, a time delay network for delaying the triggering on of said first transistor by a predetermined interval after the arrival of an input square wave pulse from the Schmitt trigger, a normally off second transistor having its base coupled with the output of said first transistor so as to be turned on simultaneously with the turning on of the first transistor, and a restoring network operatively connected with the collector of said second transistor for restoring said time delay network after the passage of said predetermined interval.

2. The combination of claim 1 in which said time delay network includes a capacitor connected between the base of the first transistor and ground.

3. The combination of claim 1 in which said restoring network connects with said time delay network between said capacitor and ground and includes a diode.

4. A system for measuring D.C. pulses that have been distorted by transmission over an intermediate facility which comprises input means sensitive to a change of state for detecting pulse initiation and termination; squaring means interconnected to and controlled by said input means for reconstructing pulses detected by said input means in a form simulating the original pulses; and delay means interconnected to said squaring means for shifting the phase of reconstructed squared pulses a predetermined time constant to eliminate transient pulses of lesser period; and output means interconnected to said squaring means and to said delay means and activated by reconstructed squared pulses of periods greater than said predetermined time constant.

5. The system of claim 4 wherein said input means comprises an r–c parallel coupled network wherein the capacitance conducts the A.C. component of the distorted pulse to activate and inactivate said squaring means and wherein the resistance conducts the D.C. component of the distorted pulse to maintain the activation of said squaring means.

6. The system of claim 5 wherein said squaring means comprises a Schmitt trigger.

7. The system of claim 6 including a restoring network operatively connected to restore said delay means after passage of the time interval corresponding to said predetermined time constant.

8. A system for measuring D.C. pulses that have been distorted by transmission over an intermediate facility which comprises input means sensitive to a change of state for detecting pulse initiation and termination, squaring means interconnected to and controlled by said input means for reconstructing pulses detected by said input means in a form simulating the original pulses, a normally off first transistor, a time delay network for delaying the triggering on of said first transistor by a predetermined interval after the arrival of an input square wave pulse from the squaring means, a normally off second transistor having its base coupled with the output of said first transistor so as to be turned on simultaneously with the turning on of the first transistor, and a restoring network operatively connected with the collector of said second transistor for restoring said time delay network after the passage of said predetermined interval.

References Cited
UNITED STATES PATENTS

| | | | |
|---|---|---|---|
| 2,567,851 | 9/1951 | Lipkin | 328—162 XR |
| 2,672,554 | 3/1954 | Roussel | 328—164 |
| 2,997,600 | 8/1961 | Hilberg et al. | 307—88.5 |
| 3,026,427 | 3/1962 | Chisholm | 328—164 |
| 3,210,562 | 10/1965 | Yoshizawa et al. | 307—88.5 XR |
| 3,246,243 | 4/1966 | Widl | 328—55 XR |
| 3,254,233 | 5/1966 | Kobayashi et al. | 328—162 XR |
| 3,277,309 | 10/1966 | Rennie | 307—88.5 XR |

ARTHUR GAUSS, *Primary Examiner.*

J. A. JORDAN, *Assistant Examiner.*